United States Patent [19]

Mallory et al.

[11] Patent Number: 4,964,018

[45] Date of Patent: Oct. 16, 1990

[54] MULTI-PURPOSE DISPLAY MODULE SYSTEM FOR AN ELECTRONIC INSTRUMENT

[75] Inventors: Robert L. Mallory; Gary D. Basey, both of Portland; Robert L. Gainer, West Linn, all of Oreg.

[73] Assignee: Tektronix, Inc., Beaverton, Oreg.

[21] Appl. No.: 417,354

[22] Filed: Oct. 5, 1989

[51] Int. Cl.$^5$ .............................................. H02B 1/04
[52] U.S. Cl. ................................... 361/391; 248/917; 312/223; 361/334; 361/419; 340/815.14
[58] Field of Search ............... 340/815.01, 815.14; 248/27.1, 917; 361/331, 334, 340, 356, 369–371, 391, 393, 394, 417, 419, 420, 427, 429; 174/52.1, 58; 312/223, 282

[56] References Cited

U.S. PATENT DOCUMENTS

| | | | |
|---|---|---|---|
| 2,566,064 | 8/1951 | Keim | 174/52.1 |
| 3,856,450 | 10/1958 | Padgett | 174/52.1 |
| 4,625,259 | 11/1986 | Krechmer | 361/334 |
| 4,667,271 | 5/1987 | Wilson | 361/380 |

Primary Examiner—Gerald P. Tolin
Attorney, Agent, or Firm—Francis I. Gray

[57] ABSTRACT

A multi-purpose display module system for an electrical instrument has a readily detachable display module for remote use that can be quickly reattached. The display module is readily adjusted in tilt angle, whether attached or remoted. A front frame with a recess is mounted on the front of a main chassis for the instrument. Latches are mounted on the main chassis and extend into the recess on opposite sides of the recess, the ends of the latches defining a rotation axis across the recess. A display module has clutch assemblies frictionally, rotatably mounted on opposing sides to fixedly engage the ends of the latches when the display module is mounted within the recess. Release of one latch allows the display module to be removed and set up independently with a stand integral with the clutch assemblies, the display module being electrically connected to the electrical instrument by an electrical cable of suitable length. The integral stand provides a means for remotely setting up the display module at any desirable viewing angle when remoted. Thus the tilt of the display module may be adjusted while the display module either is mounted within the instrument or is remoted from the instrument.

4 Claims, 4 Drawing Sheets

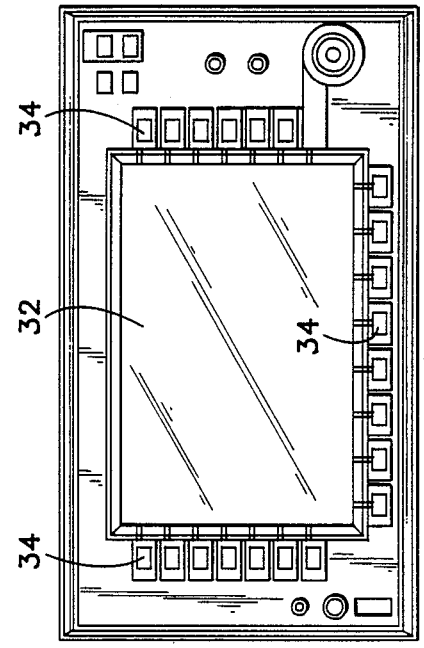
FIG.6A (FRONT VIEW)
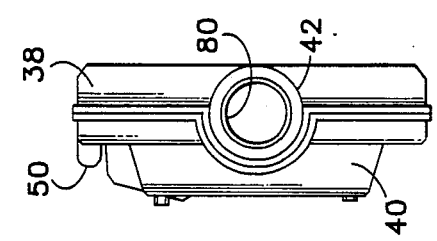
FIG.6B (SIDE VIEW)
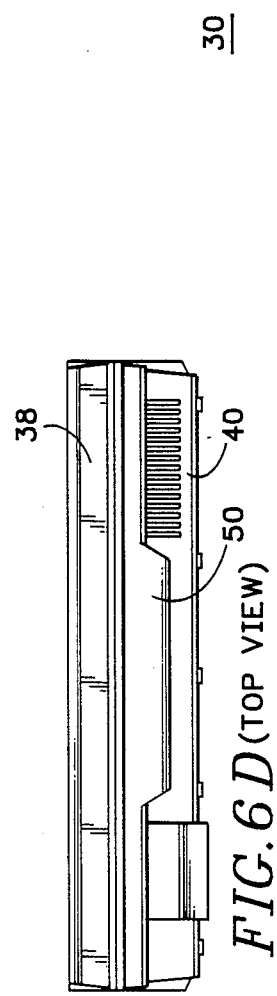
FIG.6D (TOP VIEW)
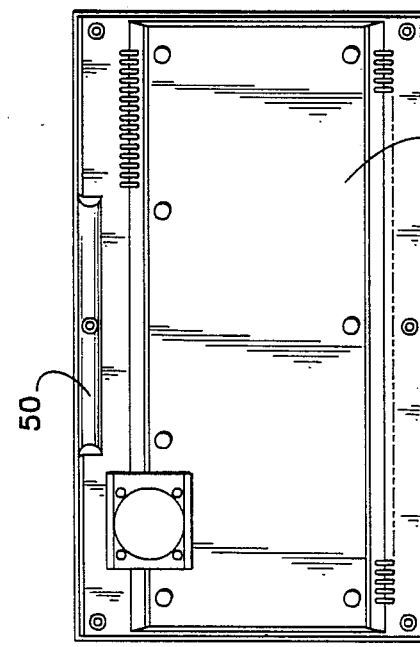
FIG.6C (BACK VIEW)

MULTI-PURPOSE DISPLAY MODULE SYSTEM FOR AN ELECTRONIC INSTRUMENT

BACKGROUND OF THE INVENTION

The present invention relates to display monitors for electronic instruments, and more particularly to a multi-purpose display module system for an electronic instrument that includes a display module that may be used remotely or mounted in the chassis of the electronic instrument and that has a wide range of tilt angles within the chassis with a quick engage/detach mechanism for removing and replacing the display module in the chassis.

Conventionally electronic instruments have display monitors built into the instrument, as in conventional oscilloscopes, logic analyzers, spectrum analyzers, waveform monitors, vectorscopes, etc., or have a separate monitor that is cabled to the electronic instrument by a conventional electrical port. The separate monitors are generally of the larger cathode ray tube type that are too large to be incorporated into the electronic instrument. In a test and measurement instrument suite several instruments may be rack mounted in fixed locations. Due to the height of the instrument in the rack, the built in display module may not be at the best viewing angle for an operator. Furthermore, the operator may be performing tests at a bench that is remote from the instruments, requiring the operator to constantly turn back and forth between the device under test and the instrument to view the results.

Therefore what is desired is a display monitor that may be readily adjustable in tilt angle within the chassis of an electronic instrument, or that may be readily detached and remoted from the electronic instrument.

SUMMARY OF THE INVENTION

Accordingly the present invention provides a multi-purpose display module system for use with an electronic instrument that includes a display module that has a wide range of tilt angles, such as +/−30°, with respect to the chassis of the electronic instrument and that is readily detachable from the chassis for use remote from the electronic instrument. An instrument chassis has a front frame with a relatively deep recess within which a display module is detachably mounted. Spring latches are cantilever mounted to the instrument chassis and extend into opposing interior sides of the deep recess, defining an axis across the front frame about which the display module may rotate. The display module includes a flat panel display with recessed control buttons surrounding the display to define a grid. The display module has a front panel and a back panel that interlock with a tongue and groove joint to provide EMI shielding to the interior. The front panel includes ears that align with the latches within the recess. Fixedly mounted on each ear is a clutch assembly having a hub configured to fit closely within a depression integral with the corresponding latch. The clutch assembly is friction loaded so that when the display module is tilted about the axis of rotation, the display module stays in place while the operator operates the buttons on the front panel. The display module is electrically connected to the electronic instrument by a cable that plugs into an appropriate port on the front of the instrument. Depressing one of the latches frees the display module so that it can be removed from the chassis and remoted while still in electrical connection with the instrument via the cable. An integral handle makes for ease of handling the display module separately, and a stand integral with the clutch assembly allows the display module to be free standing and tiltable when remoted.

The objects, advantages and other novel features of the present invention are apparent from the following detailed description when read in light of the appended claims and attached drawing.

BRIEF DESCRIPTION OF THE DRAWING

FIGS. 6a–d are plan views, front, side, back and top respectively, of the multi-purpose display module according to the present invention.

DESCRIPTION OF THE PREFERRED EMBODIMENT

Figure 1:
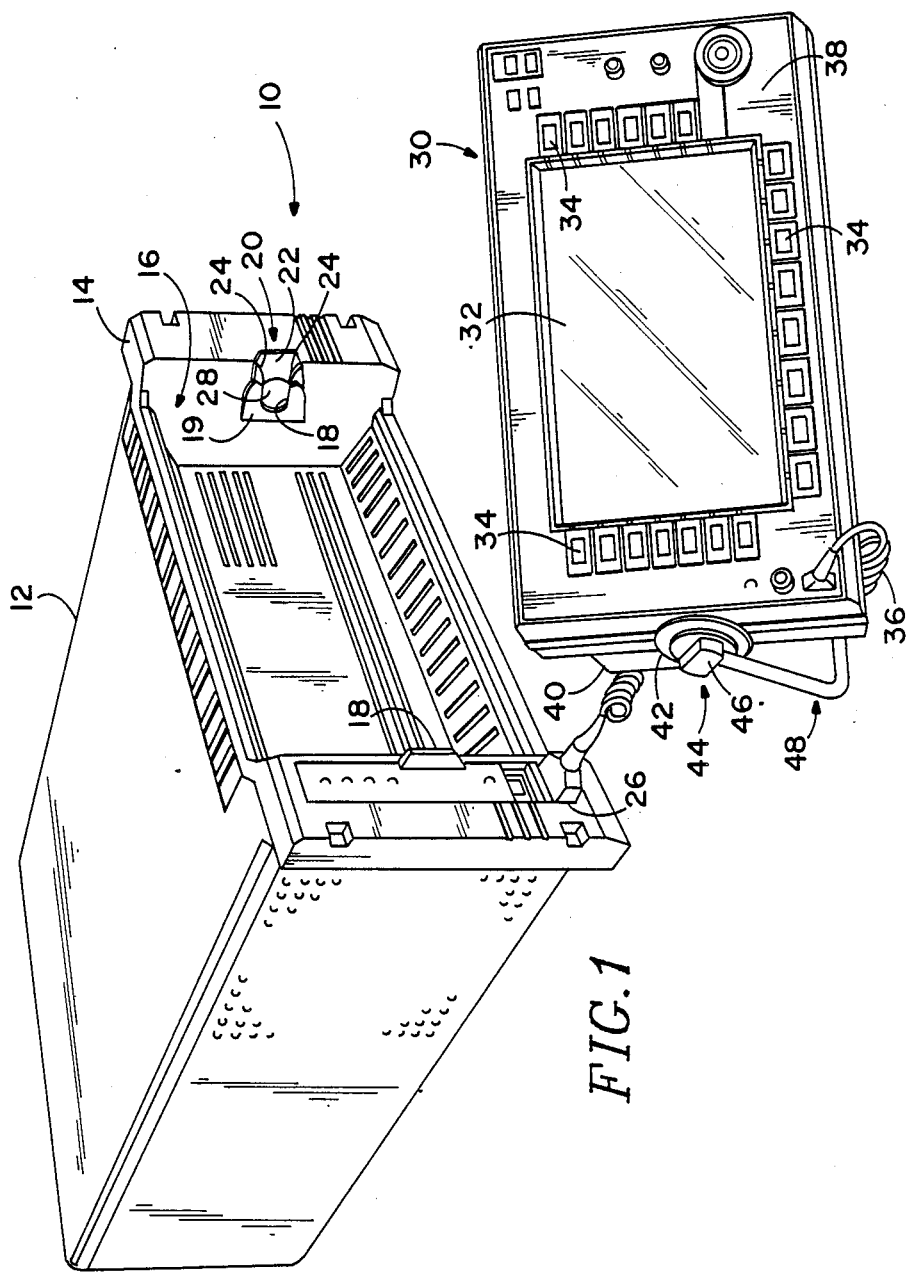
FIG. 1 is a perspective view of an electronic instrument with a multi-purpose display module according to the present invention.

Referring now to FIG. 1 an electronic instrument 10 is shown having a main chassis 12 within which the electronics of the electronic instrument are contained. A front frame 14 is mounted to the front of the main chassis 12, the front frame having a relatively deep recess 16 exposed to the front and having opposing cutouts 18 on opposing internal faces of the recess. A latch 20 is fixedly mounted to the main chassis 12 at one end, with the other end having a ramp 22 and funnel 24 configuration extending through the cutout 18 so that it is exposed within and extends exterior to the recess 16 at the front edge. A display module 30, having a flat panel display 32 with recessed control buttons 34 surrounding the display, is electrically connected with the main chassis 12 via a detachable electrical cable 36 that connects to an electrical port 26 of the instrument 10.

The display module 30 has a front panel section 38 and a back panel section 40 that mates with a tongue and groove joint to provide EMI shielding to the interior of the display module 30. Integral with the front panel section 38 are opposing ears 42 that align with the latches 20 when the display module 30 is installed within the front frame 14. Rotatably mounted on each ear 42 is a friction clutch assembly 44 that has a hub 46 with a configuration that closely matches a corresponding depression 28 in the latch 20. Integral with the clutch assembly 44 is a stand 48 so that the display module 30 may be free standing and tiltable when remoted from the electronic instrument 10. The stand 48 also serves to keep the opposing clutch assemblies 44 rotationally aligned with each other.

In operation the display module 30 is inserted into the chassis by aligning one hub 46 with its corresponding latch depression 28 and then sliding the opposing hub up the ramp 22, guided by the funnel 24, until it engages the opposing latch depression. Now the display module 30 may be tilted within the recess 16 by applying sufficient force to either the upper or lower edge of the front panel 38 to overcome the friction of the clutch assemblies 44. The angular tilt is limited only by the depth of the recess 16, and tilts of +/−30° are obtainable. To release the display module 30 one of the clutch assemblies 44 is disengaged from its corresponding latch 20 by pressing outwardly on the ramp 22 and that end of the display module is slid out. An integral handle 50 in the back panel section 40 allows for easy one-handed operation and carrying of the display module 30. The friction of the clutch assemblies 44 is sufficient to allow operation of the control buttons 34 by an operator without changing the tilt of the display module 30 when the display module is mounted within the front frame 14.

Figure 2:
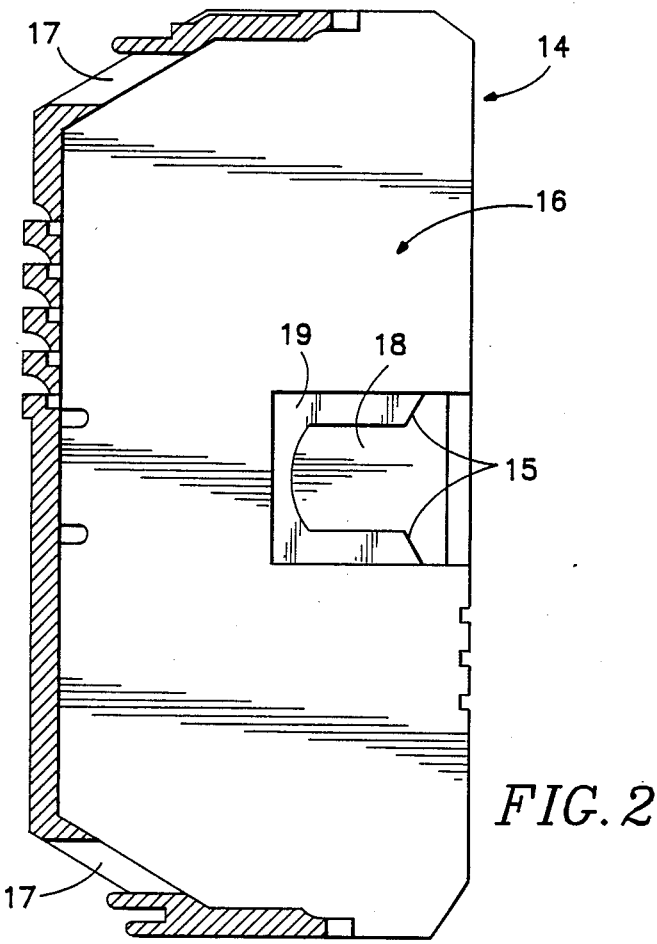
FIG. 2 is a cross-sectional view of a front frame of the electronic instrument according to the present invention.

The front frame 14 is shown in greater detail in FIG. 2. The cutout 18 is configured to match the depression 28 in the latch 20 and the hub 46 of the clutch assembly 44. The cutout 18 supports the display module 30 while the latch 20 retains it in the main chassis 12. A land 19 is built up internal to the recess 16 and partially surrounds the cutout 18, encompassing the back and a portion of each side. The front portion 15 of the land 19 is tapered inwardly toward the cutout 18 to match the funnel 24 configuration of the latch 20. The front frame 14 also includes air vents 17 to provide cooling for the display module 30 when mounted in the front frame.

Figure 3:
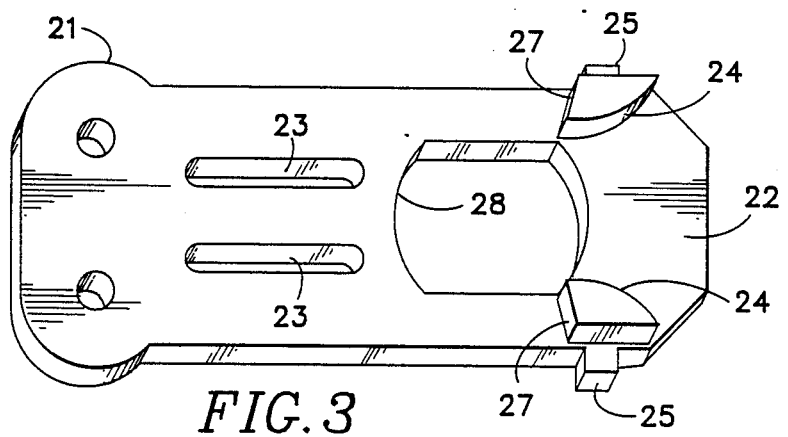
FIG. 3 is a perspective view of a latch for mounting on the electronic instrument according to the present invention.

The latch 20, as shown in greater detail in FIG. 3, has a mounting end 21 for fixedly attaching the latch to the main chassis 12. The latch is of a relatively stiff material so that when the ramp end 22 is depressed under pressure, the latch returns to its original position when the pressure is removed. Slots 23 in the latch 20 near the attachment end 21 provide a less rigid portion of the latch where the maximum bending of the latch under pressure occurs. An integral support bar 25 provides additional strength and stiffening of the latch 20 at the ramp end 22. As stated above the configuration of the back edge 27 of the funnel 24 matches the front end 15 of the land 19 in the front frame 14.

Figure 4:
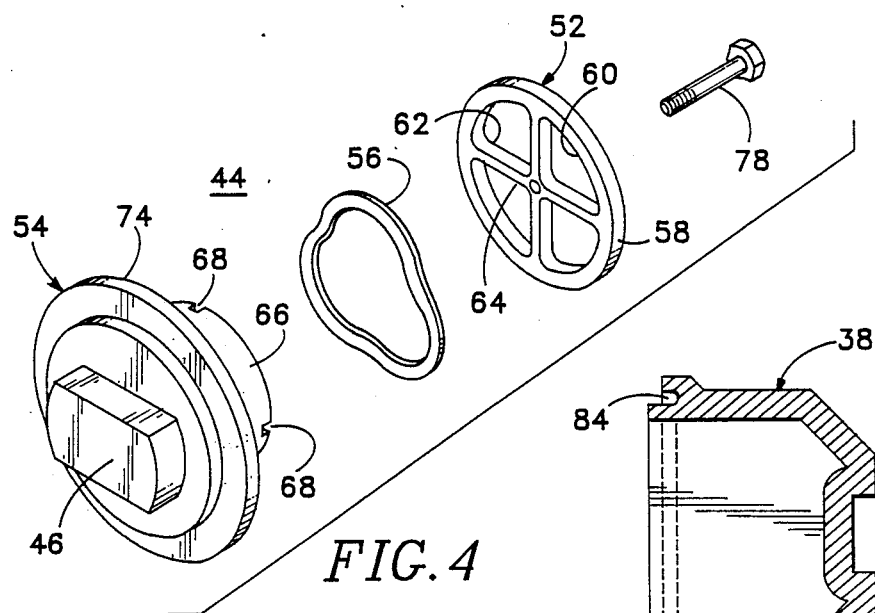
FIG. 4 is an exploded perspective view of a clutch assembly for the multi-purpose display module according to the present invention.
Figure 5:
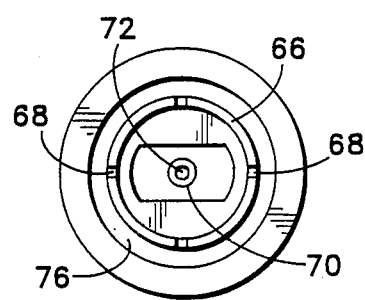
FIG. 5 is a bottom plan view of the clutch assembly of FIG. 4.

The clutch assembly 44 has an interior casing 52, an exterior casing 54 that includes the hub 46, and a spring 56, as shown in FIG. 4. The interior casing 52 is in the form of a shallow cap, or a disc, with a central depression 58 on one side. Within the central depression 58 are diametrical raised ribs 60 with a central circular portion 62 having a central hole 64. The opposite side of the central circular portion 62 has a countersunk depression (not shown) about the central hole 64. The exterior casing 54 has a tubular main portion 66 with slits 68 in the interior end that engage the raised ribs 60 of the interior casing 52. Along the axis of the tubular portion 66, as shown in FIG. 5, is a post 70 having a centrally threaded hole 72, the threaded hole being aligned with the central hole 64 of the interior case 52 when the interior and exterior cases are joined. Surrounding the tube 66 is an integral flange portion 74 that seals the exterior end of the tube, the hub 46 being an integral portion of the exterior part of the flange portion. A circular groove 76 in the interior part of the flange portion 74 surrounds the circumference of the tube 66. The groove 76 engages an opposing rim surrounding a hole 80 on the ear 42 of the front panel 38. The tubular portion 66 of the exterior casing 54 extends through the hole 80 in the ear portion 42 of the front panel 38 and engages the interior of the central depression 58 of the interior casing 52, with the slits 68 encompassing the ribs 60. Around the tube 66 is placed the annular wave spring 56. A screw 78 is inserted through the central hole 64 to threadedly engage the threaded hole 72 of the exterior casing 54 to securely hold the clutch assembly 44 together. The length of the tube 66 is determined so that the spring 56 is held against the display module 30 with sufficient friction to prevent movement when an operator touches the control buttons, but not so tight as to require too great a force to tilt the display module within the recess. The head of the screw 78 fits within the countersunk hole of the interior casing 52. Once assembled the spring 56 mounted on the tube 66 frictionably engages the inner surface of the ear 42.

Figure 7:
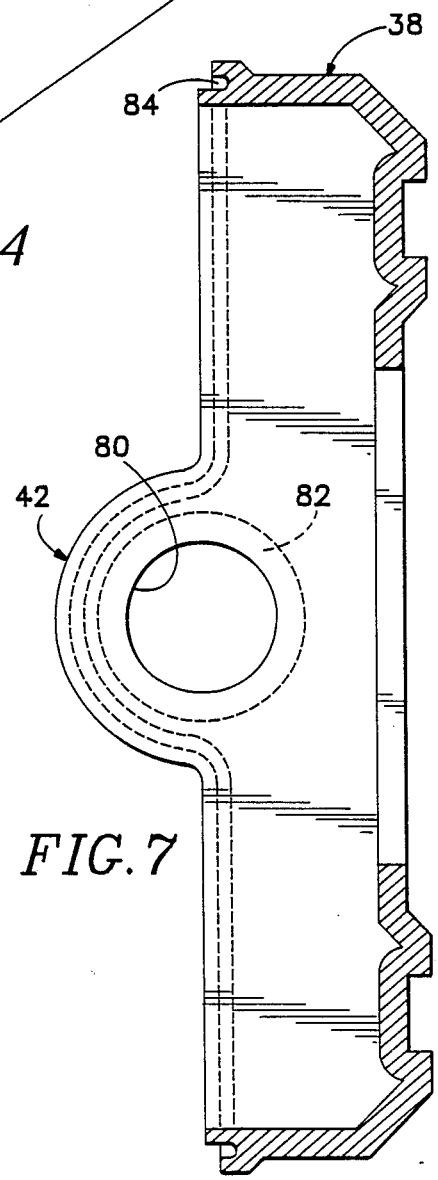
FIG. 7 is a cross-sectional view of the front panel of the multi-purpose display module of FIG. 6.

As shown in FIGS. 6 and 7 the front panel 38 has the integral ear 42 with the hole 80 through which the tubular portion 66 of the exterior casing 54 of the clutch assembly 44 extends to engage the interior casing 52. An exterior bearing surface 82 of the ear 42 surrounding the hole 80 provides the surface against which the flange 74 exerts its frictional pressure on the exterior while the spring 56 exerts pressure on the interior annular surface.

A groove 84 completely surrounds the back edge of the front panel 38, and the back panel 40 has a corresponding tongue to engage the groove to provide a sealed, EMI resistant display module 30 when the two panels are joined by suitable means.

Thus the present invention provides a multi-purpose display module for an electrical instrument that may be rotatably mounted within a recess at the front of the instrument to allow the display module to be tilted to any desirable angle, the mounting being in the form of a cantilever latch mounted on the instrument and extending into the recess, the latch retaining the display module in the instrument while the recess supports it. The latch has a depression that matches a hub on a clutch assembly mounted on the display module. By releasing the latch the display module may be removed from the instrument and set up on an integral stand remote from the instrument, the electrical connection between the instrument and the display module being maintained by an electrical cable of suitable length.

What is claimed is:

1. A multi-purpose display module system for an electrical instrument having a main chassis comprising:
    a front frame fixedly attached to the front of the main chassis, the front frame having a recess and opposing slots at either end of a rotational axis across the recess;
    a display module for detachably, rotatably mounting within the recess;
    a pair of latches attached to the main chassis and extending through the opposing slots;
    a pair of clutch assemblies frictionally, rotatably mounted on the display module so that when the display module is mounted within the recess the clutch assemblies are fixedly engaged by the latches; and
    means for electrically connecting the display module to the electrical instrument.

2. A multi-purpose display module system as recited in claim 1 wherein the display module comprises:
    a front panel section having opposing ears with central holes therethrough, each ear having a bearing surface around the central hole with the clutch assemblies mounted on the ears via the central holes;

a back panel section that engages the front panel section with a tongue and groove configuration to provide an EMI shield; and means for securely joining the front and back panel sections together.

3. A multi-purpose display module system as recited in claim 1 wherein the latch comprises:

an elongate body having a mounting end and a free end, the free end having an interior depression and a ramp and funnel configuration to guide one of the clutch assemblies to engage the interior depression when mounting the display module within the recess; and means for fixedly attaching the mounting end to the main chassis.

4. A multi-purpose display module system as recited in claim 1 wherein each clutch assembly comprises:

an interior casing;

an exterior casing that extends into the display module to engage the interior casing, the exterior casing having an exterior hub that fixedly engages one of the latches when the display module is mounted in the recess;

a spring between the interior casing and an interior bearing surface of the display module so that when the interior and exterior casings are joined together frictional resistance to rotation is exerted between the clutch assembly and the display module; and means for fixedly joining the interior and exterior casings together.

* * * * *